US008939708B2

(12) United States Patent
Gorlov

(10) Patent No.: US 8,939,708 B2
(45) Date of Patent: Jan. 27, 2015

(54) UNIVERSAL SPHERICAL TURBINE WITH SKEWED AXIS OF ROTATION

(75) Inventor: Alexander M. Gorlov, Brookline, MA (US)

(73) Assignee: Northeastern University, Boston, MA (US)

( * ) Notice: Subject to any disclaimer, the term of this patent is extended or adjusted under 35 U.S.C. 154(b) by 537 days.

(21) Appl. No.: 13/322,718

(22) PCT Filed: May 28, 2010

(86) PCT No.: PCT/US2010/036570
§ 371 (c)(1),
(2), (4) Date: Nov. 28, 2011

(87) PCT Pub. No.: WO2010/138812
PCT Pub. Date: Dec. 2, 2010

(65) Prior Publication Data
US 2012/0070294 A1    Mar. 22, 2012

Related U.S. Application Data

(60) Provisional application No. 61/181,903, filed on May 28, 2009.

(51) Int. Cl.
*F03D 5/00* (2006.01)
*F03B 17/06* (2006.01)

(52) U.S. Cl.
CPC . *F03D 5/00* (2013.01); *F03B 17/06* (2013.01); *F05B 2210/16* (2013.01); *F05B 2210/404* (2013.01); *F05B 2240/921* (2013.01); *F05B 2250/241* (2013.01); *Y02E 10/28* (2013.01);

(Continued)

(58) Field of Classification Search
USPC ............... 415/4.1–4.5, 71, 75, 905, 907, 908;
416/132 B, 227 R, 228, 237, 243
See application file for complete search history.

(56) References Cited

U.S. PATENT DOCUMENTS 1,835,018 A * 12/1931 Darrieus ..................... 415/224
RE24,542 E    9/1958 Hutson
(Continued)

FOREIGN PATENT DOCUMENTS

DK    135292    3/1977
WO    WO 2007/113399    10/2007

*Primary Examiner* — Igor Kershteyn
(74) *Attorney, Agent, or Firm* — Wilmer Cutler Pickering Hale and Dorr LLP

(57) ABSTRACT

A universal spherical reaction turbine for any flowing fluid at any depths or elevation that is capable of unidirectional rotation under reversible flow conditions. The turbine includes a rotatable shaft that is adapted to rotate about an axis of rotation; turbine blade support members that are fixedly attached to the rotatable shaft and a plurality of meridian turbine blades. The meridian turbine blades are fixedly attached to diametrically-opposite points that define a geometrical north-south meridian axis that is oriented at a skew angle to the axis of rotation of the rotatable shaft. The skew angle is greater than zero and less than 180 degrees, and, more preferably, between 25 and 35 degrees. The skewing ensures that those turbine blades that are attached to the diametrically-opposite points move on a helical trajectory with respect to the axis of rotation.

19 Claims, 3 Drawing Sheets

(52) U.S. Cl.
CPC .............. *Y02E 10/70* (2013.01); *Y10S 415/905* (2013.01); *Y10S 415/907* (2013.01); *Y10S 415/908* (2013.01)
USPC ................ 415/4.1; 415/71; 415/75; 415/905; 415/907; 415/908; 416/132 B; 416/227 R; 416/228; 416/237; 416/243

(56) References Cited

U.S. PATENT DOCUMENTS

| | | | |
|---|---|---|---|
| 2,934,295 A | 4/1960 | Wilson | |
| 3,229,517 A * | 1/1966 | Smith | 415/7 |
| 4,151,051 A | 4/1979 | Evans | |
| 4,207,026 A | 6/1980 | Kushto | |
| 4,492,875 A | 1/1985 | Rowe | |
| 4,555,218 A * | 11/1985 | Jonsson et al. | 416/17 |
| 5,269,647 A * | 12/1993 | Moser | 415/2.1 |
| 6,616,402 B2 * | 9/2003 | Selsam | 415/3.1 |
| 7,132,760 B2 * | 11/2006 | Becker | 290/55 |
| 7,156,609 B2 * | 1/2007 | Palley | 415/4.2 |
| 7,335,000 B2 * | 2/2008 | Ferguson | 417/7 |
| 7,847,426 B1 * | 12/2010 | Griffith et al. | 290/44 |
| 7,887,283 B1 * | 2/2011 | Mongan | 415/2.1 |
| 7,959,411 B2 | 6/2011 | Schlabach et al. | |
| 8,061,993 B2 * | 11/2011 | Sassow | 416/176 |
| 8,096,750 B2 * | 1/2012 | McEntee et al. | 415/4.2 |

* cited by examiner

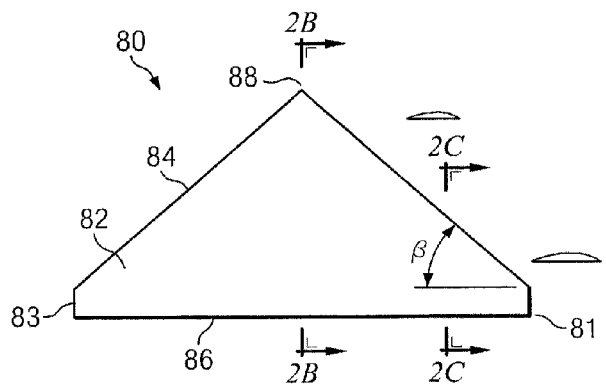
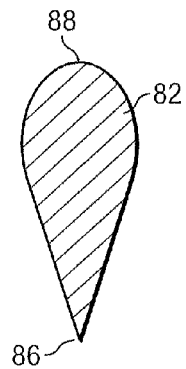
FIG. 2A
FIG. 2B
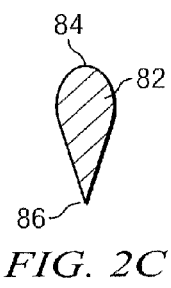
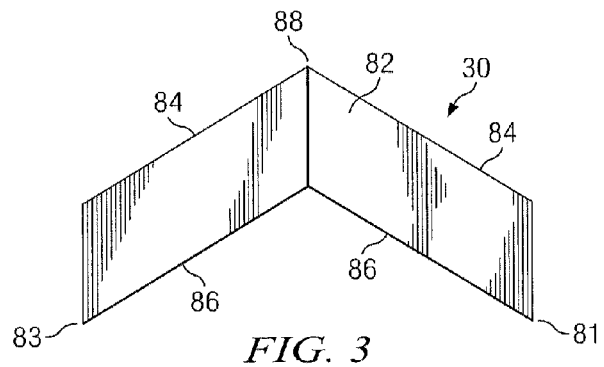
FIG. 2C
FIG. 3
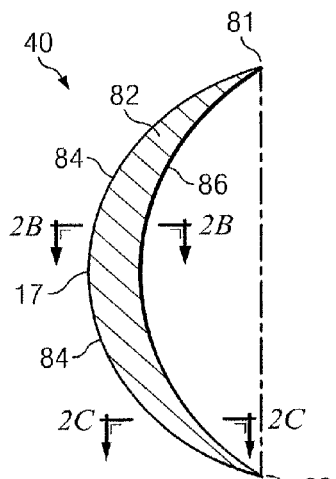
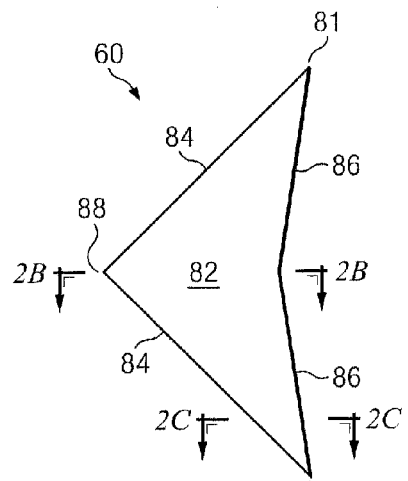
FIG. 4
FIG. 5

UNIVERSAL SPHERICAL TURBINE WITH SKEWED AXIS OF ROTATION

CROSS REFERENCE TO RELATED APPLICATIONS

The present invention claims priority of U.S. Provisional Patent Application 61/181,903 filed on May 28, 2009.

STATEMENT REGARDING FEDERALLY SPONSORED RESEARCH OR DEVELOPMENT

N/A

BACKGROUND OF THE INVENTION

Machines and turbines that generate electrical power from fluid flow energy, e.g., wind power, hydro-power, and the like, are well known to the art. For example, U.S. Pat. No. 5,451,137 discloses a Gorlov Helical Turbine (GHT), which provides a marked improvement to vertical-axis or Darrieus-type machines. Helical turbines blades are unidirection, which is to say that, regardless of the direction of flow and point of attack, they rotate in a single direction. Helical turbine blades also travel at a constant speed without acceleration and deceleration. As a result, turbines using helical blades reduce the effects of pulsation and a corresponding lower turbine efficiency that result from cyclical acceleration and deceleration. This leads to increased operational power and strength.

The Gorlov '137 reaction turbine is capable of providing high-speed, unidirectional rotation under a reversible, ultra-low head pressure and/or high-velocity fluid flow. The Gorlov '137 reaction turbine includes a working wheel that is disposed about a rotating shaft. The rotatable shaft is typically oriented transversely to the direction of fluid flow through the turbine channel.

The working wheel of the GHT includes a plurality of airfoil-shaped, helical turbine blades. Each turbine blade has a leading edge and a trailing edge and is structured and arranged to rotate always in the direction of the leading edge regardless of the direction of fluid flow. The airfoil shape produces a lift force in a direction perpendicular to the surface of the airfoil, which is to say, substantially radially from the rotating shaft.

U.S. Pat. No. 6,253,700 to Gorlov discloses yet another helical turbine assembly that is capable of providing high-speed, unidirectional rotation. The assembly includes an array of helical turbine units similar to those described in the Gorlov '137 patent, whose rotatable shaft is oriented vertically or horizontally. Problematically, when the turbine has a cylindrical or spherical shape, the helical blades must be bent in two orthogonal planes. More particularly, helical blades require additional left-hand or right-hand twisting in the plane of the cross section to adjust the helical blades to conform with the cylindrical or spherical, i.e., arcuate surface, which increases the cost of manufacture because the blade must be manufactured to have various angles of inclination.

Notwithstanding the apparent advantages of helical turbines, it would be desirable to provide a universal spherical turbine that is absolutely symmetrical and works with any fluid, e.g., any gas or any liquid, at any depth or altitude—and especially at relatively high altitudes such as within the troposphere—that impacts the turbine or the blades of the turbine from any direction of fluid flow in a closed or in an open environment. It would also be advantageous to provide a universal spherical turbine whose blades always travel along a helical path with respect to the direction of fluid flow but that are not constructed as helical blades.

These desirable improvements to the concept of a helical turbine can be effected by skewing the geometrical axis of the turbine blades with respect to the axis of rotation. Indeed, by skewing the non-helical turbine blades making up a spherical turbine, rotation of the non-helical blades are made to travel along a helical path with respect to the direction of fluid flow.

In short, it would be desirable to provide a universal spherical turbine that benefits from unidirectional rotation and minimal vibration from pulsation that accompany helical turbine blades, but without having to construct turbine blades with a helical form.

SUMMARY OF INVENTION

A spherical reaction turbine for any fluid type at any depth or elevation, which is capable of unidirectional rotation under reversible flow conditions, is disclosed. A spherical reaction turbine is advantageous because, by design, it always remains symmetrical to flow, which is particularly useful in urban areas with tall buildings and in planar regions where winds are unstable, e.g. Patagonia. Moreover, in the field of mechanical engineering, a spherical frame is potentially the strongest and most reliable three-dimensional frame.

The turbine includes a rotatable shaft that is adapted to rotate about an axis of rotation and turbine blade support members that are fixedly attached to the rotatable shaft and to a plurality of meridian turbine blades. Geographically, a meridian is an imaginary arc on the Earth's surface that extends from the North pole to the South pole. In this invention, a meridian blade is an arced section lying on the surface of a non-solid sphere, extending from a "north" point to a diametrically-opposite "south" point.

The ends of each non-helical, air-foil-shaped, meridian turbine blade are fixedly attached to the diametrically-opposite points, which points define a geometrical north-south meridian axis, which is oriented at a skew angle to the axis of rotation of the rotatable shaft. The skew angle is greater than zero and less than 180 degrees, and, more preferably, between 25 and 35 degrees. The skewing ensures that the non-helical, air-foil-shaped, meridian turbine blades travel in a helical trajectory with respect to the axis of rotation and with respect to the direction of fluid flow.

The meridian turbine blades can be configured in a full, 360-degree hoop arrangement or can include a combination of two hemispherical, 180-degree arcuate sections. Each of the turbine meridian blades can have an air-foil cross-section whose dimensions can be constant along the entire length of the meridian or that can have an air-foil cross-section that is tapered, having a maximum dimension at a midpoint, which is equidistant from both the north and south points of the geometrical meridian axis, to a minimum dimension at each of the north and south points. The number of turbine blades can be odd or even.

BRIEF DESCRIPTION OF THE DRAWINGS

The foregoing and other objects, features, and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

Furthermore, the invention will be more fully understood by referring to the Detailed Description of the Invention in conjunction with the Drawings, of which:

FIG. 2A is a diagrammatic view of a delta-shaped turbine blade;

FIG. 2B is a cross-section of the delta-shaped turbine blade taken about lines 2B-2B in FIG. 2A;

FIG. 2C is a cross-section of the delta-shaped turbine blade taken about lines 2C-2C in FIG. 2A showing that the air-foil shape has tapered;

FIG. 3 is a diagrammatic view of a rectangular V-shaped turbine blade;

FIG. 4 is a diagrammatic view of a modified delta-shaped turbine blade;

FIG. 5 is a cross-sectional view of the delta-shaped and modified delta-shaped turbine blades of FIG. 2A and FIG. 4, respectively;

DETAILED DESCRIPTION OF THE INVENTION

Figure 1:
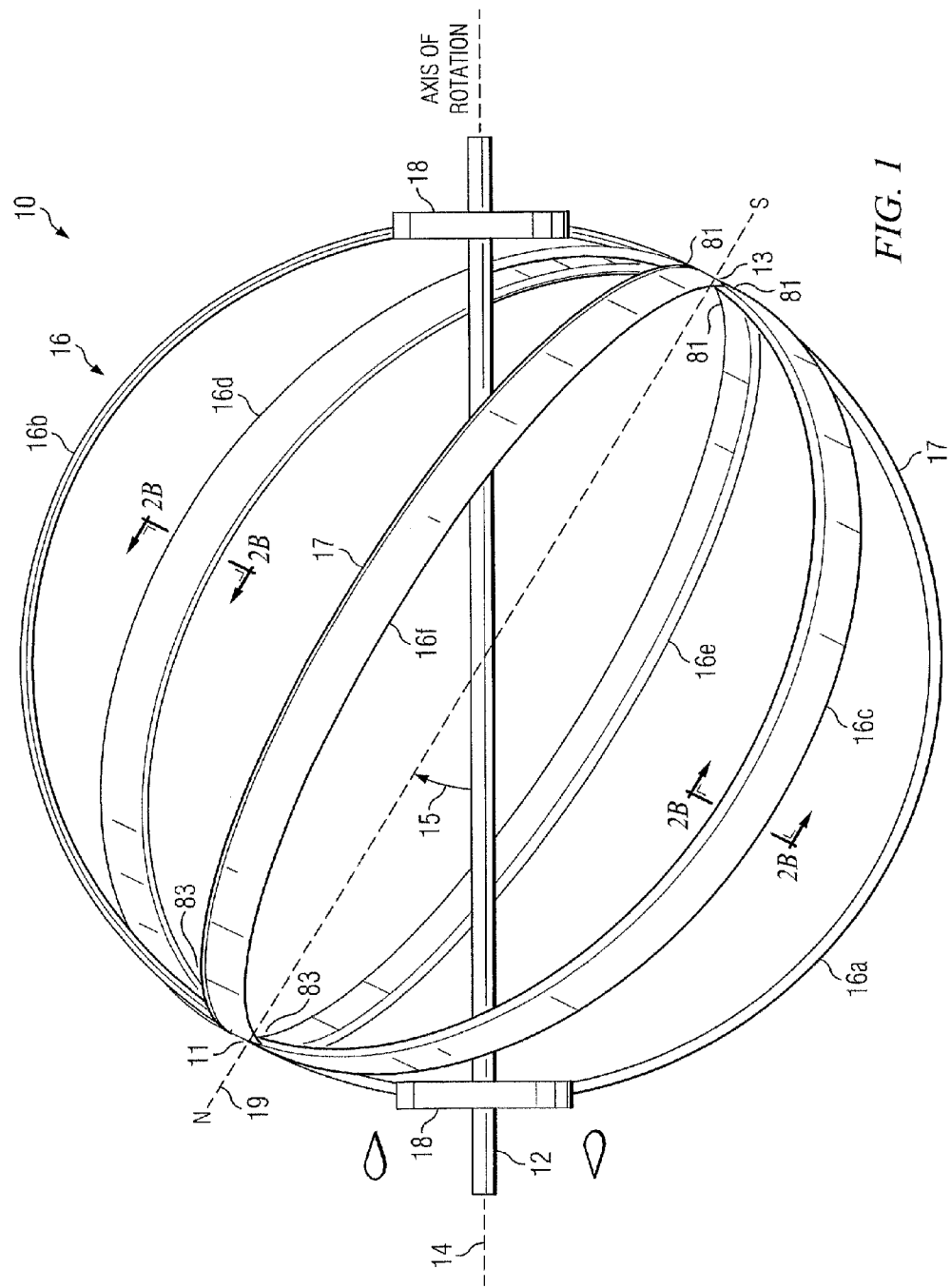
FIG. 1 is a diagrammatic view of a spherical reaction turbine with a skewed axis of rotation in accordance with the present invention.

Referring to FIG. 1 there is shown a universal spherical turbine 10 that is adapted to convert energy from any fluid flow, e.g., wind power, hydro-power, and the like, at any depth or elevation into mechanical or electrical energy. The spherical turbine 10 is symmetrical, to derive power from a fluid traveling from and in any direction.

The spherical turbine 10 includes a rotatable shaft 12 that is adapted to rotate about an axis of rotation 14 and which is supported by at least two bearings (not shown). The rotatable shaft 12 is coupled to a power-generating device, so that torque from the rotatable shaft 12 produces mechanical or electrical power in manners that are well known to those of ordinary skill in the art. Although the axis of rotation 14 in FIG. 1 preferably is horizontal or substantially horizontal, because of the symmetry of the spherical turbine 10, the axis of rotation 14 can be horizontal or vertical or any angle in between.

A least two blades 16a and 16b are fixedly attached to a blade support members 18, which, in turn, is fixedly attached to the rotatable shaft 12 so that movement of the blade support members 18 cause rotation of the rotatable shaft 12. The blade support members may comprise parallel or substantially parallel, circular or substantially circular discs that are fixedly mounted in a spaced relation on the rotatable shaft 14. Alternatively, the blade support members 18 may comprise other configurations, such as a single central disc, radial spokes alone, and the like.

The blades 16a and 16b are fixedly attached at each of their ends 81 and 83, extending transversely from one disc 18 to the other disc 18, creating a non-solid, fluid transmitting sphere. Although referred to as "blades", reference numbers 16a and 16b do not have to be turbine blades with air-foil cross-sections at all and can be, instead, for example, a support hoop having an arrow-type cross-section. Irrespective of the design of the cross-section of the blades 16a and 16b, each of the blades 16a and 16b is structured and arranged so that rotation always occurs from the trailing edge of the blade to the leading edge of the blade.

A plurality of meridian turbine blades 16 are also mechanically coupled to the rotatable shaft 12 via blades 16a and 16b and the blade support member 18. The number of meridian turbine blades 16 can be an even integer or an odd integer. Geographically speaking, a meridian is an imaginary arc on the Earth's surface that extends from the North pole to the South pole. In the same vein, for this invention, a meridian blade 16 is a turbine blade having an arced section lying on the non-solid sphere's "surface", extending from a "north" point 11 to a "south" point 13.

For example and not for the purpose of limitation, meridian blades 16c-16f are each fixedly attached at north and south points 11 and 13, which are diametrically opposite one another. More particularly, first ends 81 of meridian blades 16c-16f are fixedly attached to a first meridian blade 16a at the south point 13 and second ends 83 of each of the meridian blades 16c-16f are fixedly attached to the second meridian blade 16b at the north point 11. An imaginary line between the north point 11 and the south point 13 is a geometrical north-south meridian axis 19. Advantageously, the geometrical north-south meridian axis 19 is skewed from the axis of rotation 14.

Figure 6:
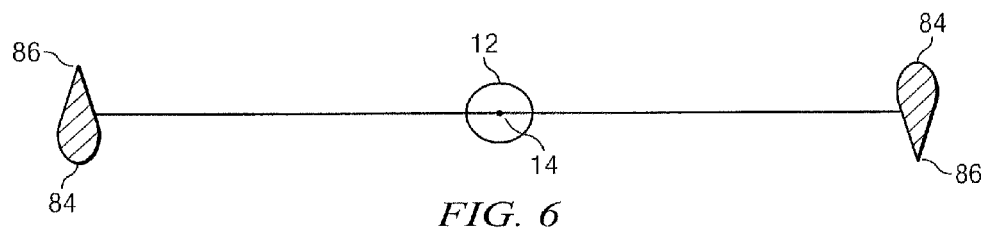
FIG. 6 is a diagrammatic plan view of a pair of air-foil-type turbine blades showing the relationship between leading and trailing edges on each hemisphere.

The meridian blades 16 can be structured and arranged to be full 360-degree hoops and/or each meridian blade 16 can be structured and arranged to be a 180-degree arc that is attached at the north and south point 11 and 13. As shown in FIG. 6, because the turbine blades 16 always travel in a direction from the trailing edge 84 to the leading edge 86, the cross-sections at diametrically-opposite locations is reversed. This poses no problems when the blades 16 are 180-degree arcs; however, when the blades 16 are continuous, 360-degree hoops, there must be a transition zone between the two reversed cross-sections at the region of intersection.

In cross section, meridian blades 16 are structured and arranged so that a liquid or gaseous fluid impacting the meridian blades 16 causes them to move in the same direction regardless of the angle of attack of the fluid. More specifically, referring to FIG. 2B and FIG. 2C, each meridian blade 16 travels in a tangential path that is in the direction from the trailing edge 86 to the leading edge 84 or 88.

During operation of the spherical reaction turbine 10, despite the offset caused by the skewing, meridian blades 16c-16f are structured and arranged to rotate about the axis of rotation 14, as are blades 16a and 16b. As a result, rotation of meridian blades 16c-16f causes rotation of the rotatable axis 14, which mechanical force can be used to generate electrical power by means of an electrical generator coupled to the shaft 12. Advantageously, when the skew angle 15 between the north-south meridian axis 19 and the axis of rotation 14 is greater than zero (0) and less that 180 degrees—actually less than 90 degrees due to symmetry—meridian blades 16c-16f travel on a helical trajectory with respect to the rotatable shaft 12 and the axis of rotation 14. In short, the present invention takes advantage of the benefits of "helical turbine blades" without having to manufacture, i.e., twist and re-twist, helical turbine blades about a cylindrical or a spherical non-solid surface.

Although any skew angle 15 greater than zero (0) can be used, preferably, a skew angle 15 between about 25 degrees and 35 degrees—and, more preferably a skew angle 15 of about 30 degrees—substantially replicates the performance of a helical turbine without having to use helical blades. Thus, any meridian blade(s) 16 on the right sphere have the same section profile along the north-south meridian axis 19, which vastly simplifies construction.

Referring to FIGS. 2B and 2C, each meridian turbine blade 16c-16f and, optionally, both of the blades 16a and 16b that rotate about the axis of rotation 14 has an air-foil or a substantially air-foil-like cross-section such as that described in greater detail in the '137 and the '700 Gorlov patents, which are incorporated herein by reference. In one embodiment (FIG. 1), the air-foil cross-section can have a constant dimension along the entire length of the meridian blade 16, which is to say that the meridian turbine blades 16c-16f (and blades 16a and 16b) have the same section profile, e.g., as shown in FIG. 2B, between the north point 11 and the south point 13. This arrangement greatly simplifies manufacture and lowers production costs.

Other non-helical blades can be integrated into a spherical reaction turbine 10. For example, as shown in FIG. 2A, FIG. 3, and FIG. 5, the turbine blades can be structured and arranged to have, respectively, a delta shape 80 (FIG. 2A), a rectangular V-shape 30 (FIG. 3), and a modified delta shape 60 (FIG. 5). FIG. 4 shows the cross-section of each of the blades 80, 30, and 60 that taper from the "equator" or midpoint 17 of each blade 60, 30, and 60 to the north and the south points 11 and 13 so that the section profile at the equator 17 (FIG. 2B) is larger than the section profile at either of the points 11 and 13 (FIG. 2C).

Delta-shaped blades 80 and 60 increase the Reynolds number, which usually leads to better turbine performance and a substantial reduction in turbine vibration with. Unlike the meridian blades 16 described hereinabove, delta-shaped 80, rectangular V-shaped 30, and modified delta-shaped blades 60 are fixedly attached at the axis of rotation 14. Hence, for delta-shaped 80, rectangular V-shaped 30, and modified delta-shaped blades 60, the skew angle is zero or substantially zero degrees.

Delta-shaped blades 80 and 60 also include a leading edge 84 and a trailing edge 86. The angle $\beta$, corresponding to the angle of the sides to a line normal to the blade's centerline, typically ranges between 30 degrees and 60 degrees.

Delta-shaped blades 80 and 60 are thickest near the blade's nose 88, which provides the greatest torque presents the least width transversely to the flow of fluid. The least thickness of the delta-shaped blades 80 occurs at the trailing edge 86 as shown in FIG. 2B and FIG. 2C.

Spherical reaction turbines having a skewed axis of rotation can be used in open and closed systems for hydro-power and wind power application. For example, a spherical reaction turbine can be installed in water pipes, conduits, tunnels, sewer or waste water outfall systems, and the like, or in canals or other waterways where there is tidal or other unconfined water flow. For wind power, a spherical turbine can be installed in a Venturi or other tube or tunnel, on a pole, tower, top of a tall structure, and so forth or in any area subject to high-velocity winds.

One of the advantageous of spherical reaction devices 10 is a self-sustaining lift capability that is capable of propelling the device 10 in a vertical direction as long as there is an adequate wind force. Indeed, the resultant force from the wind also must be large enough to overcome the lift and drag forces.

Figure 7:
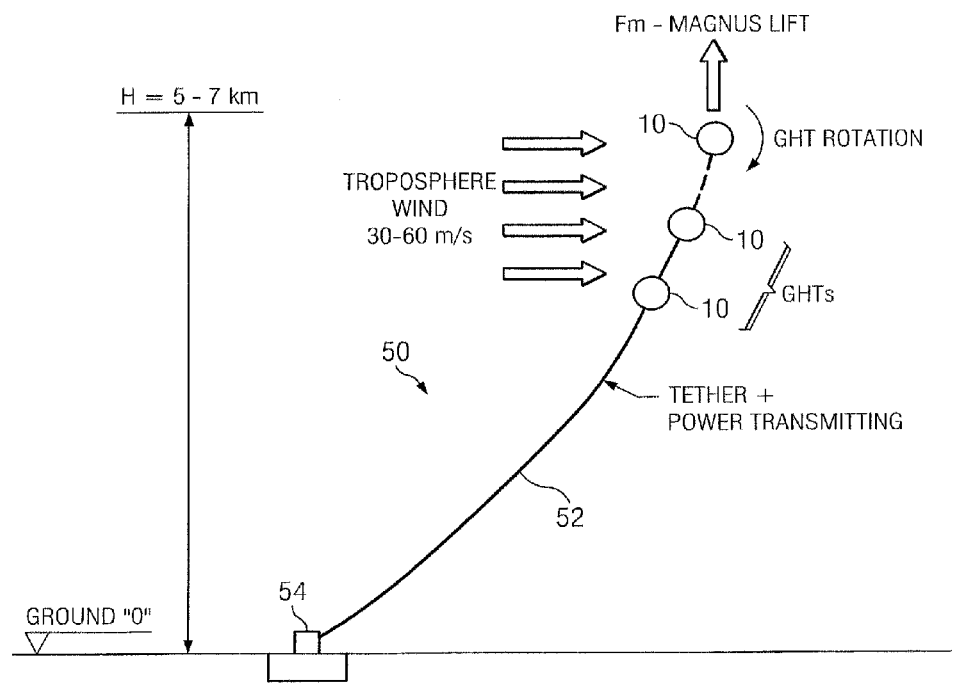
FIG. 7 is a schematic view of a high-altitude application of a spherical reaction turbine within the troposphere.

A particular application of a spherical turbine 10 with a skewed axis of rotation is shown in FIG. 7. At between 20 and 40 degrees north latitude, a 50-meter diameter high-altitude wind turbine located at an altitude between 5000 and 7000 meters above sea level, i.e., in the troposphere, where wind speeds are typically between 30 and 60 m/sec, can generate 10-15 MW of power. Such a system 50 requires sophisticated tether and power transmission systems 52 and 54, which is clearly in the purview of those of ordinary skill in the art. As shown, wind speeds in the troposphere can generate Magnus lift forces ($F_m$) sufficient to overcome gravitational pull with an acceptable factor of safety. As is well-known to those of ordinary skill in the art, the Magnus effect is developed by a spinning body and, therefore, can be used to elevate the spherical reaction turbine 10 to a desired elevation within the troposphere and to maintain it at a desired inertial attitude in space.

Although the invention is described through the above-described exemplary embodiments, it will be understood by those of ordinary skill in the art that modifications to, and variations of, the illustrated embodiments can be made without departing from the inventive concepts disclosed herein. Accordingly, the invention should not be viewed as limited, except by the scope and spirit of the appended claims.

What I claim is:

1. A spherical reaction turbine capable of unidirectional rotation under reversible flow, the turbine comprising:
   a rotatable shaft, having an axis of rotation;
   a plurality of meridian turbine blades disposed along respective meridians between diametrically-opposite points that define a geometrical north-south meridian axis,
   the geometrical north-south meridian axis being oriented at a skew angle with respect to the axis of rotations of the rotatable shaft; and
   a support structure fixedly attached to the rotatable shaft and to the plurality of meridian turbine blades, to support said plurality of meridian turbine blades at the skew angle orientation.

2. The spherical reaction turbine as recited in claim 1, wherein the skew angle is greater than zero degrees and less than 180 degrees.

3. The spherical reaction turbine as recited in claim 2, wherein the skew angle is greater than 25 degrees and less than 35 degrees.

4. The spherical reaction turbine as recited in claim 3, wherein the skew angle is about 30 degrees.

5. The spherical reaction turbine as recited in claim 1, wherein each of the plurality of meridian turbine blades has a delta shape and the skew angle is zero or substantially zero.

6. The spherical reaction turbine as recited in claim 1, wherein each of the plurality of meridian turbine blades has a rectangular V-shape and the skew angle is zero or substantially zero.

7. The spherical reaction turbine as recited in claim 1, wherein each of the plurality of meridian turbine blades has a tapering cross section that is smallest proximate the diametrically-opposite points and largest at a point equidistant from each of said two points.

8. The spherical reaction turbine as recited in claim 1, wherein each of the plurality of meridian turbine blades is a continuous hoop or is a semi-circular hemisphere.

9. The spherical reaction turbine as recited in claim 1, wherein the support structure can include meridian turbine blades.

10. A spherical reaction turbine capable of unidirectional rotation under reversible flow, the turbine comprising:
    a rotatable shaft, having an axis of rotation;
    a plurality of meridian turbine blades disposed along respective meridians between diametrically-opposite points that define a geometrical north-south meridian axis,
    wherein the plurality of meridian turbine blades are structured and arranged so that when the rotatable shaft rotates, some of the meridian turbine blades travel along a helical trajectory with respect to the axis of rotation; and a support structure fixedly attached to the rotatable shaft and to the plurality of meridian turbine blades, to support said plurality of meridian turbine blades at the skew angle orientation.

11. The spherical reaction turbine as recited in claim 10, wherein each of the plurality of meridian turbine blades is a continuous hoop or a semi-circular hemisphere.

12. The spherical reaction turbine as recited in claim 10, wherein the skew angle is greater than zero degrees and less than 180 degrees.

13. The spherical reaction turbine as recited in claim 12, wherein the skew angle is greater than 25 degrees and less than 35 degrees.

14. The spherical reaction turbine as recited in claim 13, wherein the skew angle is about 30 degrees.

15. The spherical reaction turbine as recited in claim 10, wherein each of the plurality of meridian turbine blades has a delta shape and the skew angle is zero or substantially zero.

16. The spherical reaction turbine as recited in claim 10, wherein each of the plurality of meridian turbine blades has a rectangular V-shape and the skew angle is zero or substantially zero.

17. The spherical reaction turbine as recited in claim 10, wherein each of the plurality of meridian turbine blades has a tapering cross section that is smallest proximate the two points and largest at a point equidistant from each of said two points.

18. The spherical reaction turbine as recited in claim 10, wherein travel along the helical trajectory with respect to the axis of rotation is provided by orienting the geometrical north-south meridian axis at a skew angle with respect to the axis of rotations of the rotatable shaft.

19. A spherical reaction turbine capable of unidirectional rotation under reversible flow, the turbine comprising:
- a rotatable shaft having an axis of rotation;
- at least one turbine blade support member that is fixedly attached to the rotatable shaft;
- a first plurality of meridian turbine blades that is fixedly attached to the at least one turbine blade support; and
- a second plurality of meridian turbine blades that is fixedly attached to the first plurality of meridian turbine blades at two, diametrically-opposite points that define a geometric north-south axis that is oriented about the axis of rotation of the rotatable shaft at a skew angle.

\* \* \* \* \*